US006801769B1

(12) United States Patent
Royalty (10) Patent No.: US 6,801,769 B1
(45) Date of Patent: Oct. 5, 2004

(54) MODULAR AIRCRAFT INFORMATION NETWORK SYSTEM AND AN ASSOCIATED METHOD OF PACKAGING THE SAME

(75) Inventor: Charles D. Royalty, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/387,169

(22) Filed: Mar. 12, 2003

(51) Int. Cl.[7] ............................................... H04Q 7/20
(52) U.S. Cl. ..................................................... 455/431
(58) Field of Search .......................... 455/431, 84, 129, 455/140, 277.1, 280, 349; 710/306; 370/225; 439/61

(56) References Cited

U.S. PATENT DOCUMENTS

| | | | |
|---|---|---|---|
| 5,778,203 | A | 7/1998 | Birkedahl et al. |
| 6,133,846 | A | 10/2000 | Birkedahl et al. |
| 6,394,815 | B1 | 5/2002 | Sarno et al. |
| 2003/0003872 | A1 | 1/2003 | Brinkley et al. |

OTHER PUBLICATIONS

WAEA Internet Working Group (IWG), On–Board Infrastructure AD HOC; *White Paper: On–Board Infrastructure, Version 1.0;* 2001; 18 pages; World Airline Entertainment Association.

*Primary Examiner*—William Cumming
(74) *Attorney, Agent, or Firm*—Alston & Bird LLP (57) ABSTRACT

A modular aircraft information system is provided for communicating information onboard an aircraft. The modular aircraft information system includes a backplane and a network router module, and may include an avionics interface module. The backplane is capable of receiving at least one COTS device such that the COTS devices can be electrically coupled and/or decoupled to the backplane. The network router module can interface with at least one avionics device. The network router module is in electrical communication with the backplane and the avionics interface module such that the network router module is capable of passing communications between the COTS devices and the avionics devices when the COTS devices are electrically coupled to the backplane. The network router is also capable of isolating the backplane from the avionics devices such that the COTS devices, when electrically coupled to the backplane, are at least partially isolated from the avionics devices.

30 Claims, 3 Drawing Sheets

MODULAR AIRCRAFT INFORMATION NETWORK SYSTEM AND AN ASSOCIATED METHOD OF PACKAGING THE SAME

FIELD OF THE INVENTION

The present invention relates generally to aircraft information networks and, more particularly, relates to a modular aircraft information network utilizing commercial off-the-shelf technology.

BACKGROUND OF THE INVENTION

In the aircraft industry, there is an increasing interest in the use of non-aviation computer technology, often termed commercial off-the-shelf (COTS) technology, in non-essential aircraft applications. This interest is driven, in part, by the low-cost availability of advanced applications and equipment developed for the large commercial computing market. As will be appreciated, however, the aircraft industry poses significant design, operational, and regulatory burdens on equipment utilized in aircraft. Also, equipment utilized in aircraft must typically interoperate with ground-based functions utilized during operation of aircraft. In addition, the technologies required for successful implementation of a single function aboard an aircraft are rarely completely designed by a single company. The universal implementation of such technologies is typically organized into interfacing layers, with hardware, lower level software, middleware and applications provided by a vast network of companies. Implementation of similar functions for aircraft use can theoretically follow one of two paths: (a) meet all of the standard design and production objectives by having one or more companies specifically contracted to produce the functions; or (b) plan to acquire major portions of the required hardware and software functionality by the purchase of predefined products that are integrated by one or more companies specifically contracted to produce the functions.

Typically, the only economically feasible solution to the implementation of similar functions for aircraft use is to acquire major portions of technology in the form of purchased products which are, of necessity, not specifically designed for aircraft use (i.e., COTS devices). Such a conclusion is not new. Efforts to deploy aircraft COTS technologies began more than a decade ago as it became obvious that functional and performance requirements precluded traditional custom avionics development. As will be appreciated, there are significant differences in regulatory and environmental-related requirements between traditional aviation electronics and non-aviation COTS electronics regardless of the COTS market source. In this regard, experience has shown that some of these differences are so high that life-cycle costs may not be reduced in all instances, and can even be increased, if appropriate design and process changes are not implemented for systems using COTS components.

Typically, to successfully produce a part for use aboard an aircraft, five major steps must be accomplished: equipment production, equipment qualification, aircraft installation (including integration), aircraft certification, and aircraft operation (continued airworthiness). As will be appreciated, then, each of these steps involves substantially higher cost than any equivalent process in other markets. During the past efforts to deploy aircraft COTS technologies, progress has been made toward reducing design, production and aircraft certification costs for the use of COTS equipment. However, the expense of qualification, installation and rapid obsolescence continue to keep costs high enough for this type of equipment that the airline industry has found it difficult to justify its expense.

As an example of how the expense of qualification, installation and rapid obsolescence continue to keep costs high for COTS technologies, consider that many systems aboard aircraft can be designed to include both COTS technologies and aircraft-specific technologies. Also, consider that many systems employed aboard aircraft are embodied in separate enclosures, referred to as line replaceable units (LRU's), which are interconnected as a federated network. Typically, each LRU must be qualified before the aircraft can be operated with an installed LRU. As will be appreciated then, each LRU must also typically be qualified after any additions, reductions or other modifications are made to the LRU. Such a qualification, while beneficial in identifying any problems with the LRU's before use in an aircraft, typically requires qualification of the entire LRU, regardless of the modification. In this regard, qualifications of LRU's can require an undesirable amount of time to complete, and can be costly. By utilizing COTS technology with a reduced service life, or higher obsolescence, in LRU's that may otherwise have a higher service life, LRU's employing COTS technology will typically go through a larger number of costly qualifications, as compared to LRU's employing only aircraft-specific technology.

SUMMARY OF THE INVENTION

In light of the foregoing background, the present invention provides a modular aircraft information network system and an associated method of packaging the same. The modular aircraft information network system of embodiments of the present invention is a less costly network than conventional aircraft information networks. More particularly, embodiments of the present invention reduce cost by sharing resources (e.g., power supply), and utilizing less-costly connections between various, typically internal, elements while consolidating more-costly, higher speed connections between external elements. Embodiments of the present invention also permit commercial off-the-shelf (COTS) devices to be integrated into the network in a modular manner, with COTS devices easily added to and/or removed from the network. In this regard, the COTS devices are typically electrically, mechanically and electromagnetically isolated from avionic devices, as well as the aircraft within which the network is installed. As such, COTS devices can be added to or removed from the network without requiring changes to, or requalification of, remaining avionic devices, including those that may operate with the COTS devices.

According to one aspect of the present invention, a modular aircraft information system is provided for communicating information onboard an aircraft. The modular aircraft information system includes a backplane and a network router module, and may also include an avionics interface module. The backplane is capable of receiving at least one COTS device. The backplane can receive the COTS devices such that the COTS devices are capable of being electrically coupled and/or decoupled to the backplane. The network router module is capable of interfacing with at least one avionics device. The network router module is in electrical communication with the backplane such that the network router module is capable of passing communications between the COTS devices and the avionics devices when the COTS devices are electrically coupled to the backplane. The network router module can be capable of interfacing with the avionics devices via at least one optical fiber. In turn, the network router module can be in electrical communication with the backplane via at least one electrical conductor. Advantageously, the network router is capable of isolating the backplane from the avionics devices such that the COTS devices, when electrically coupled to the backplane, are at least partially isolated from the avionics devices.

As indicated, the system may also include an avionics interface module. In such instances, the avionics interface module may also interface with at least one avionics device. Also in such instances, the network router module can be further in electrical communication with the backplane and the avionics interface module such that the network router module is capable of passing communications between the avionics interface module and the COTS devices when the COTS devices are electrically coupled to the backplane. Advantageously, the network router is also capable of isolating the backplane from the avionics interface module such that the COTS devices, when electrically coupled to the backplane, are at least partially isolated from the avionics devices. Also, the avionics interface module can be capable of interfacing with the avionics devices via at least one optical fiber. In turn, the network router module can be in electrical communication with the backplane and the avionics interface module via at least one electrical conductor.

The modular aircraft information system can also include at least one power supply capable of supplying power to the network router. In addition, the power supply is electrically coupled to the backplane such that the power supply is capable of supplying power, such as a predetermined level of power, to the COTS devices when the COTS devices are electrically coupled to the backplane. More particularly, the power supply can include at least one backup power module capable of supplying backup power to the COTS devices when the COTS devices are coupled to the backplane and the power supplied to the COTS devices by the power supply drops below the predetermined level. In this regard, the backup power modules are capable of supplying backup power such that the sum of the backup power and the power supplied by the power supply substantially equals the predetermined level of power.

The modular aircraft information system can further include a housing that defines an internal cavity. The internal cavity, in turn, can be capable of receiving the backplane and the network router module. In addition, the internal cavity can also be capable of receiving the COTS devices. Advantageously, the housing can be capable of at least partially isolating the backplane and the network module from an external environment including the aircraft. Similarly, the housing can isolate the COTS devices from the external environment, such as from vibration, shock, electromagnetic emissions, and/or temperature.

According to another aspect of the present invention, a method is provided for packaging a modular aircraft information system. Embodiments of the present invention therefore provide a modular aircraft information system and a method of packaging the same. As described above and more fully below, the system and method of embodiments of the present invention solve the problems identified by aircraft networking prior techniques and provide additional advantages.

DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The modular aircraft information network system of embodiments of the present invention is designed to at least partially isolate high-cost, aircraft-specific components and technology from lower-cost, more rapidly changing, commercial off-the-shelf (COTS) components and technology. As well known to those skilled in the art, when compared to avionic devices, COTS devices are typically characterized by larger production volumes, shorter production life, limited government and/or private regulation, shorter service life, small product safety impact, lower regulated configuration control and part tracking, and smaller warranties. For example, whereas a typical avionic device may have a production life of three to eight years, a typical COTS device may have a production life of only six months to two years. Also, whereas a typical avionic device may have a service lifetime of 20 years or more, a typical COTS device may have a service life of 5 years or less. By isolating aircraftspecific, or avionic, devices from COTS devices, embodiments of the present invention are therefore capable of permitting the upgrade of components, assemblies, and overall system capability over time at a much lower cost than with traditional aircraft information systems.

Figure 1:
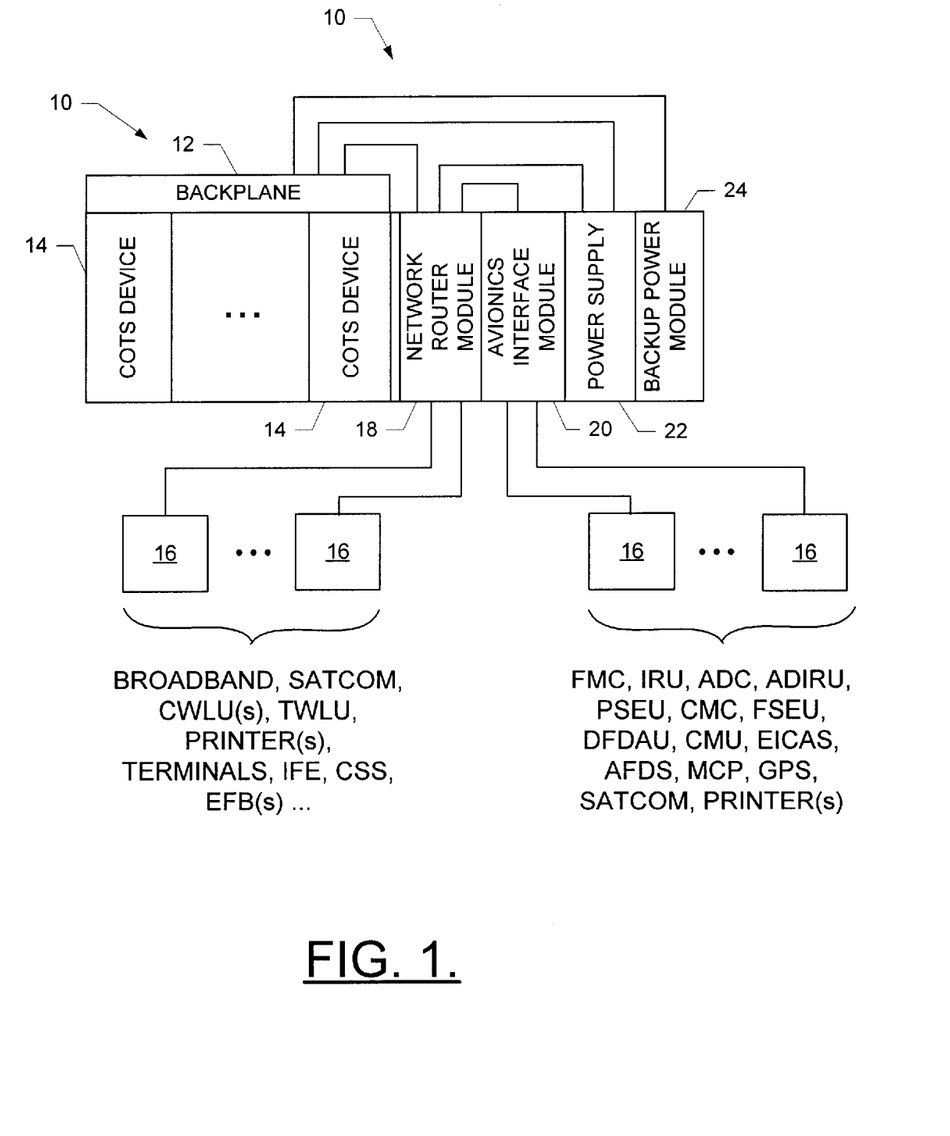
FIG. 1 is a block diagram of a modular aircraft information network according to one embodiment of the present invention.

Referring to FIG. 1, a modular aircraft information network system 10 according to one embodiment of the present invention includes a backplane 12 capable of receiving at least one COTS device 14 such that the COTS device can be electrically coupled and/or decoupled to the backplane. The backplane can be adapted to receive any number of different COTS devices, but is typically able to receive at least two COTS devices. As known to those skilled in the art, the backplane is generally an electronic circuit board that includes circuitry and a plurality of slots into which the COTS devices can be electrically coupled. The backplane can be configured in accordance with any of a number of different interconnection standards. In one advantageous embodiment, for example, the backplane can be configured in accordance with any of a number of standards that provides for plug-in cards with power and network interfaces. For example, the backplane can be configured in accordance with the Peripheral Component Interconnect (PCI) standard or the CompactPCI standard (e.g., 3U or 6U form factor CompactPCI). Alternatively, the backplane can be configured in accordance with the VME standard, as such is well known to those skilled in the art.

The COTS devices 14 can comprise any of a number of different types of electronic devices, such as electronic devices on circuit boards or cards that can be plugged into the slots to electrically couple the COTS devices to the backplane 12. In this regard, the COTS devices are typically configured to be compatible with the interconnection standard of the backplane. In one typical embodiment, the COTS devices 14 comprise server processing elements. The COTS devices of this embodiment are capable of operating in accordance with ARINC Characteristic 763 entitled: Network Server System, published by Aeronautical Radio, Inc. (hereinafter referred to as "ARIFNC 763"). More particularly, COTS server processing elements are typically capable of providing data/file storage, open systems processing and communication services to electronic devices connected throughout the aircraft local area network (LAN). For example, the COTS server processing elements can provide data/file storage, open systems processing and communication services to electronic devices such as pilot and cockpit terminals, cabin terminals, maintenance terminals, network printers, wireless LAN units, satellite transceivers and terrestrial telephony units. The system 10 can include a plurality of COTS server processing elements that are each capable of running a different operating system, and optimized for a different purpose, such as an application server or a file server. Advantageously, then, the system provides increased flexibility to the aircraft operator in the selection of applications and equipment to support operations onboard the aircraft.

The COTS server processing elements 14 are designed to a standard size, wiring interface, power and cooling requirements. The COTS server processing elements are capable of functioning as complete stand-alone processing elements, but typically receive power from a common power source, described below. In this regard, the COTS server processing elements do not each require a complex, costly power supply. Each COTS server processing element may occupy one or more slots in the backplane 12. To communicate with other elements of the system 10, each COTS server processing element slot in the backplane is provided with a high-speed network connection (e.g., 10/100/1000 Mbps or higher), and may also include a signal line to initiate a power-fail shutdown. In addition, each COTS server processing element slot in the backplane may include other standard interfaces, such as a Universal Serial Bus (USB) interface, to permit shop-servicing of modules and devices, such as the COTS server processing elements, in the system.

In addition to the backplane 12 and COTS devices 14, the system 10 may include at least one avionics device 16. The avionics devices are typically avionic-specific devices and can include, for example, KU-band satellite communications (BROADBAND) devices, L-band satellite communications (SATCOM) devices, cabin wireless LAN units (CWLAN(s)), terminal wireless LAN units (TWLAN), printers, terminals, in-flight entertainment (IFE) devices, cabin services systems (CSS) and electronic flight bags (EFB(s)). Also, avionics devices can include a flight management computer (FMC), an inertial reference unit (IRU), an air data computer ADC), an air data/inertial reference unit (ADIRU), a proximity switch electronics unit (PSEU), a central maintenance computer (CMC), a digital flight data acquisition unit (DFDAU), a communications management unit (CMU), an engine instrument/crew alerting system (EICAS), an autopilot flight director system (AFDS), a mode control panel (MCP), a global positioning system (GPS) and other avionics devices. Such avionics devices are well known to those skilled in the art, and as such, will not be discussed herein in further detail.

To at least partially isolate the COTS devices 14 from the avionics devices 16, while permitting communications between the COTS and avionics devices, the system 10 includes a network router module 18. The network router module can comprise any of a number of network routers capable of operating in accordance with embodiments of the present invention.

The network router module is in electrical communication with the backplane 12 and the avionics devices 16 such that the network router module can pass communications between the avionics devices and the COTS devices electrically coupled to the backplane. Generally, the network router module is capable of at least partially operating in accordance with draft standard ARINC 765, entitled: *Ethernet Switch Unit (ESU)* or any permutations of the same. The network router module generally facilitates high-speed (e.g., 10/100/1000 Mbps or higher) network communication between the COTS devices, and between the COTS devices and the avionics devices. Although shown and described as including one network router module, the system can include two network router modules, such as to accommodate high-availability requirements of the system.

Functional and connection requirements between the network router module 18 and the avionic devices 16 will typically dictate the exact network topology in any given installation. Based on the protocols and services defined by Internet Engineering Task Force (IETF) Request for Comments (RFC) 1122 entitled: *Requirements for Internet Hosts—Communication Layers*, the network router module can operate as a layer 2 switch and layer 3 router. In addition, the network router module can include additional network security functions, as desired, as well as capacity for growth as the networking environment changes. Advantageously, the network provided by the network router module can be reconfigurable by software changes in the network router module, thereby eliminating the need to alter the connections between the network router module and the backplane 12 (including the COTS devices 14), and between the network router module and the avionic devices, to accommodate change and growth in such elements.

As shown in FIG. 1, various of the avionic devices 16 are directly connected to the network router module 18. Others of the avionics devices, however, are in electrical communication with the network router module via an avionics interface module 20. In this regard, some of the avionics devices are electrically connected to the avionics interface module which, in turn, is electrically connected to the network router module. The avionics interface module generally provides an interface between certain avionics devices and the network router module, and, thus, the backplane 12 and the COTS devices 14. The avionics interface module, which is capable of at least partially operating in accordance with ARINC 763, provides necessary aircraft interfaces to enable the COTS devices, via the backplane and the network router module, to send to, and receive data from, those avionics devices connected to the avionics interface module.

As used herein, the avionics devices 16 can interface with the network router module 18 or the avionics interface module 20 via avionics interfaces. Generally, avionics interfaces refers to a set of those types of interfaces that tend to be aviationspecific, and in fact are often identified by their ARINC characteristic. For example, the avionics interfaces may include discretes (simple bi-state analog I/O), as well as interfaces described in standards ARINC 429, ARINC 629, and ARINC 717, the contents of all of which are hereby incorporated by reference in their entirety.

To supply power to the network router module 18 and the avionics interface module 20, the system 10 further includes a power supply 22. The power supply is electrically coupled to the backplane such that the power supply can also supply power to the COTS devices 14 electrically coupled to the backplane 12. In other terms, the power supply is capable of powering network router module, the avionics interface module and the COTS devices simultaneously, while typically limiting the power to any given module and/or device. As will be appreciated, the power supply is one typically of the more costly and design-labor intensive parts of a typical avionics computer system. Advantageously, providing for the power supply apart from the other elements (network router module, avionics interface module, backplane and COTS devices) of the system eliminates the necessity to design and integrate the expensive power supply each time one of the elements is redesigned and/or added to the system.

As will also be appreciated, many COTS devices 14 and operating system software are typically not very tolerant of unreliable power, being subject to damage when power fluctuates. Avionics devices, on the other hand, are significantly constructed to tolerate unreliable power, but at relatively high cost. As such, according to one embodiment, the power supply 22 includes a backup power module 24 capable of providing backup power in instances in which the power provided by the power supply drops below a predetermined level. More particularly, consider that the power supply is capable of providing a predetermined level of power to the COTS devices that are electrically coupled to the backplane 12. In instances in which the predetermined level of power to the COTS devices drops below the predetermined level, such as by a defined amount, the backup power module can supply backup power to the COTS devices such that the sum of the backup power and the power supplied by the power supply substantially equals the predetermined level of power for at least a temporary period of time.

The provision of the backup power module 24 in the power supply 22 can be considered the functional equivalent to a ground-based uninterruptible power supply (UPS) which, in aircraft, permits the use of less-expensive processors and software in the COTS devices. In addition, the use of the backup power module allows the system 10 to provide sufficient power to permit the elements of the system to safely shut down in the event of the failure of power to the system.

Figure 2:
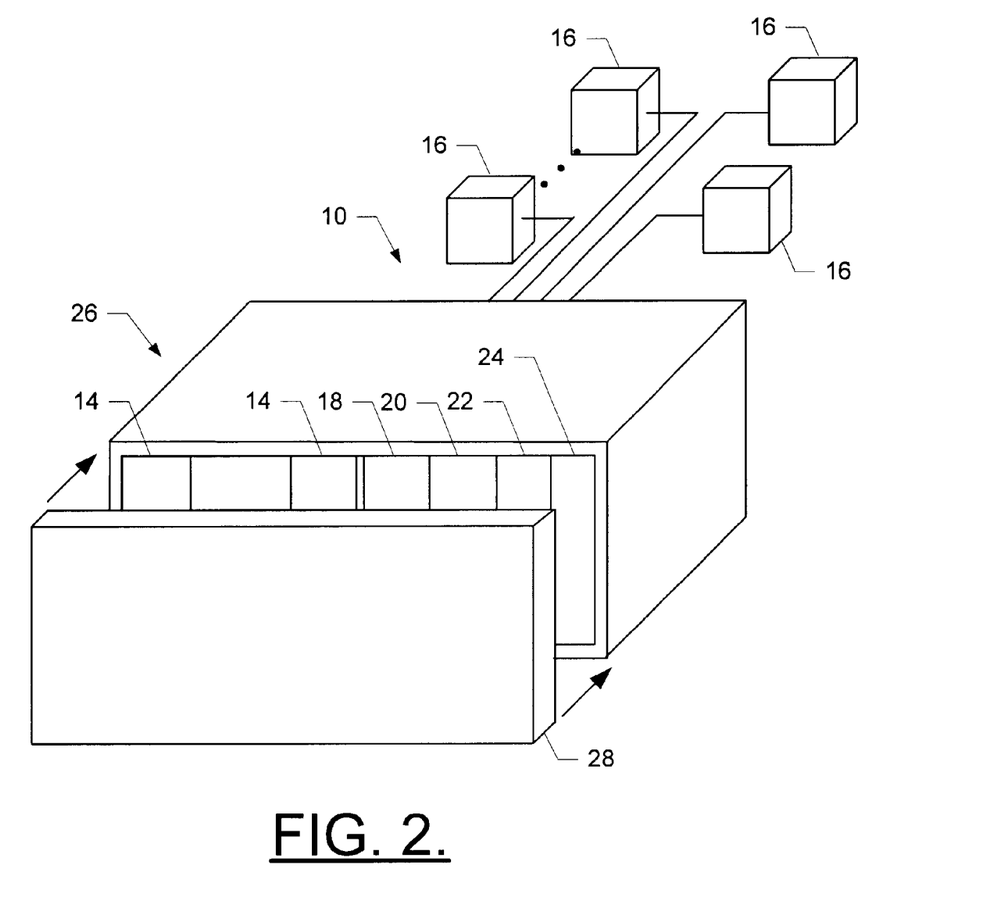
FIG. 2 is a perspective block diagram of a modular aircraft information network according to the embodiment of FIG. 1, where various elements are secured within a housing.

Although the backup power supply 24 is described above as supplying backup power to the COTS devices 14, it should be understood that the backup power supply can supply backup power to any of the other devices of the system, including the network router module 18 and the avionics interface module 20, without departing from the spirit and scope of the present invention. Also, although described above as including one power supply, the system may include more than one power supply. In this regard, the system may include a master power supply, and one or more redundant power supplies. By including multiple power supplies, one or more of the elements (COTS devices, network router module, and/or avionics interface module) of the system 10 can advantageously be removed without affecting power to any of the other elements, particularly when the power supplies operate redundantly. To at least partially physically and electro-magnetically isolate the backplane 12, COTS devices 14, network router module 18, avionics interface module 20, power supply 22 and the backup power supply 24 from the aircraft, including the avionics devices 16, the system can be secured within an internal cavity of a housing 26, as shown in FIG. 2. Thereafter, the internal cavity can be closed with a cover 28, lid or the like to thereby at least partially isolate the backplane, COTS devices, network router module, avionics interface module, the power supply and the backup power supply. The housing, otherwise known as a rack or cabinet, includes installation locations (slots) for the COTS devices, the network router module, the avionics interface module and the power supply. The cabinet generally provides the mounting structure, all necessary element-to-element interconnections for elements within the cabinet, as well as element-to-aircraft device interconnections. In addition, the cabinet can have the capability to provide cooling air to the elements within the cabinet. The cabinet can have a variable size such that the size of the cabinet can be increased or decreased to fit any of a number of different aircraft types, which may have different limitations in space, power and cooling. Also, cabinet sizing permits the incorporation of single or dual power supplies and one or more network routers for higher availability, which allows for the servicing of various elements within the cabinet while the system is in operation.

Depending upon the aircraft wiring for networking outside and up to the cabinet 26, the cabinet can also serve to reduce costs by using less expensive network wiring and network transceivers than may be used for other systems within the aircraft. In this regard, a strong incentive exists to use fiber-optic technology for high-speed networks in aircraft for performance and service reasons, but the technology is expensive to incorporate into avionics equipment. To realize the benefits of fiber-optic technology, in one embodiment, the network router module 18 and the avionics interface module 20 can interface with respective avionics devices 16 via optical fibers. Then, to adapt the cabinet and elements included therein in a more cost efficient manner, the network router module can be in electrical communication with both the backplane 12, the avionics interface module and the power supply 22 via electrical conductors, such as copper wires. In addition, the power supply can also be electrically coupled to the backplane and the avionics interface module via conductors, such as copper wires.

Figure 3:
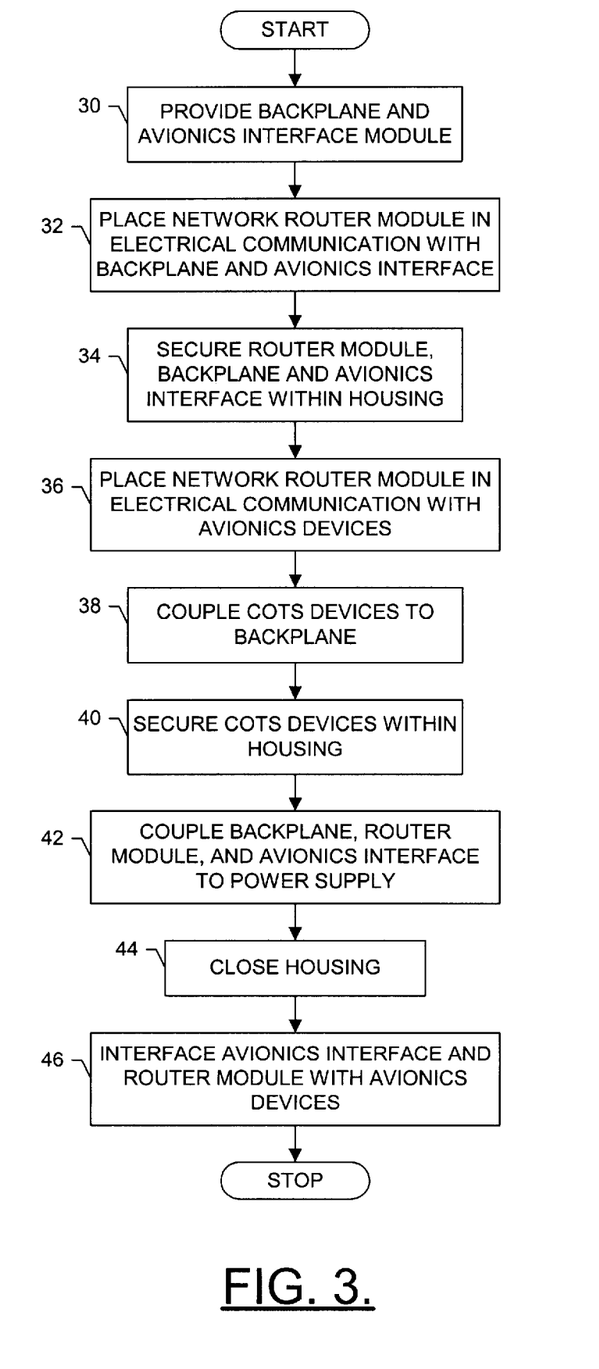
FIG. 3 is a flowchart illustrating various steps in a method of packaging a modular aircraft information network system, in accordance with one embodiment of the present invention.

According to another aspect of the present invention, a method is provided for packaging a modular aircraft information network system. According to one embodiment, as shown in FIG. 3, the method begins by providing the backplane 12 and the avionics interface module 20, as illustrated in block 30. Thereafter, the network router module 18 can be placed in electrical communication with the backplane and the avionics interface, as shown in block 32. By placing the network router module in electrical communication with the backplane and the avionics interface, the network router module can pass communications between the avionics interface module, or more particularly the avionics devices 16, and the COTS devices 14 that are electrically coupled to the backplane. As shown in block 34, either before, after or as the network router module is placed in electrical communication with the backplane and the avionics interface module, the network router module, backplane and avionics interface module can be secured within the housing 26 which, as indicated above, can include installation locations for receiving the respective elements.

Also, either before, after or as the network router module 18 is placed in electrical communication with the backplane 12 and the avionics interface module 20, the network router module can be placed in electrical communication with respective avionics devices 16, as shown in FIG. 1 and block 36. As such, the network router module can also be capable of passing communications between the COTS devices 14 and the avionics devices in electrical communication with the network router module. Advantageously, the network router module is placed in electrical communication with the backplane, avionics interface module and the respective avionics devices such that the backplane is isolated from the avionics interface in a manner so that the COTS devices, when electrically coupled to the backplane, are isolated from the avionics devices.

After placing the network router module 18 in electrical communication with the backplane 12, the avionics interface module 20 and the respective avionics devices 16, one or more COTS devices 14 can be electrically coupled to the backplane, as shown in block 38. As such, the COTS devices can be placed in electrical communication with the network router module, and more particularly the avionics devices (via the network router module and/or the avionics interface module). Like before, either before, after or as the COTS devices are electrically coupled to the backplane, the COTS devices can be secured within the housing, such as by securing the COTS devices within installation locations of the housing 26, as shown in block 40.

Before closing the housing 26, the backplane 12, network router module 18 and the avionics interface module 20 are all electrically coupled to the power supply 22, and thereby the backup power module 24, as shown in block 42. By electrically coupling the backplane to the power supply, the COTS devices can also be electrically coupled to the power supply such that the power supply can provide power to the COTS devices, as well as the network router module and the avionics interface module. Like before, the power supply, including the backup power module, can be secured within the housing, such as via an installation location within the housing. Thereafter, the housing, including the backplane, COTS devices, network router module, avionics interface module, power supply and backup power module, can be closed, such as with a cover 28, lid or the like to thereby at least partially isolate the internal cavity of the housing from an external environment, including the aircraft and the avionics devices, as shown in block 44.

At any point before operating the network system 10, the avionics interface module 20 and the network router module 18 are interfaced with the avionics devices 16. As shown in block 46, in one embodiment, for example, the avionics interface module and the network router module are interfaced with the avionics devices after closing the housing 26, and during installation of the housing, including the COTS devices 14, backplane 12, network router module, avionics interface module, power supply 22 and backup power supply 24, within the aircraft. In one particularly, advantageous embodiment where the elements within the housing are placed in electrical communication, or electrically coupled, via conductors (e.g., copper wires), the avionics interface and the network router modules are interfaced with respective avionics devices via optical fibers.

At any point before operating the network system 10, the avionics interface module 20 and the network router module 18 are interfaced with the avionics devices 16. In one embodiment, for example, the avionics interface module and the network router module are interfaced with the avionics devices after closing the housing 26, and during installation of the housing, including the COTS devices 14, backplane 12, network router module, avionics interface module, power supply 22 and backup power supply 24, within the aircraft. In one particularly, advantageous embodiment where the elements within the housing are placed in electrical communication, or electrically coupled, via conductors (e.g., copper wires), the avionics interface and the network router modules are interfaced with respective avionics devices via optical fibers.

As indicated above, COTS server processing elements 14 are typically capable of providing data/file storage, open systems processing and communication services to electronic devices connected throughout the aircraft local area network (LAN). For example, the COTS server processing elements can provide data/file storage, open systems processing and communication services to electronic devices such as pilot and cockpit terminals, cabin terminals, maintenance terminals, network printers, wireless LAN units, satellite transceivers and terrestrial telephony units. When the avionics interface module 20 interfaces with the avionics devices 16, then, the system 10 can perform a number of different functions. For example, the COTS server processing elements can be adapted to receive data from the avionics devices, such as for maintenance operations. Additionally, or alternatively, the COTS server processing elements can be adapted to transmit data to the avionics devices, such as transmitting software to the avionics devices for subsequent installation by the respective avionics devices.

Embodiments of the present invention therefore provide a modular aircraft information network system and an associated method of packaging the same. Advantageously, the modular aircraft information network system of embodiments of the present invention is a less costly network than conventional aircraft information networks. More particularly, by sharing resources such as the power supply, embodiments of the present invention reduce cost by utilizing the same resources for each element of the system. Also, the network system of embodiments of the present invention provides a less costly network system by utilizing less-costly connections (e.g., copper wire) between various elements while maintaining more-costly, higher speed connections (e.g., fiber optic) between other elements. Further, as the COTS devices are typically electrically, mechanically and electro-magnetically isolated from avionic devices, as well as the aircraft within which the network is installed, embodiments of the present invention permit commercial off-the-shelf (COTS) devices to be integrated into the network in a modular manner. As such, COTS devices can be added to or removed from the network without requiring changes to, or requalification of, remaining avionic devices, including those that may operate with the COTS devices.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A modular aircraft information system for communicating information onboard an aircraft, the modular aircraft information system comprising:

a backplane capable of receiving at least one commercial off-the-shelf (COTS) device capable of operating in an aircraft information system, wherein the backplane is capable of receiving the at least one COTS device such that the at least one COTS device is capable of being at least one of electrically coupled and decoupled to the backplane, and wherein the at least one COTS device includes a circuit board for electrically coupling and decoupling the at least one COTS device to the backplane;

a network router module capable of interfacing with at least one avionics device, wherein the network router module is in electrical communication with the backplane and the at least one avionics device such that the network router module is capable of passing communications between the at least one COTS device and the at least one avionics device when at least one COTS device is electrically coupled to the backplane, and wherein the network router is capable of isolating the backplane from the at least one avionics device such that the at least one COTS device, when electrically coupled to the backplane, is at least partially isolated from at least one avionics device.

2. A modular aircraft information system according to claim 1 further comprising at least one COTS device electrically coupled to the backplane, wherein the COTS device comprises a server processing element.

3. A modular aircraft information system according to claim 1 further comprising at least one power supply capable of supplying power to the network router, wherein the at least one power supply is electrically coupled to the backplane such that the at least one power supply is capable of supplying power to the at least one COTS device when the at least one COTS device is electrically coupled to the backplane.

4. A modular aircraft information system according to claim 3, wherein the at least one power supply is capable of providing a predetermined level of power to the at least one COTS device when the at least one COTS device is electrically coupled to the backplane, wherein the at least one power supply further includes at least one backup power module capable of supplying backup power to the at least one COTS device when the at least one COTS device is coupled to the backplane and the power supplied to the at least one COTS device by the power supply drops below the predetermined level, and wherein the at least one backup power module is capable of supplying backup power such that the sum of the backup power and the power supplied by the power supply substantially equals the predetermined level of power.

5. A modular aircraft information system according to claim 1 further comprising a housing that defines an internal cavity, wherein the internal cavity is capable of receiving the backplane and the network router module, and wherein the internal cavity is also capable of receiving at least one COTS device.

6. A modular aircraft information system according to claim 5, wherein the housing is further capable of at least partially isolating the backplane and the network module from an external environment including the aircraft, and wherein the housing is further capable of isolating at least one COTS device from the external environment.

7. A modular aircraft information system according to claim 1, wherein the network router module is capable of interfacing with at least one avionics device via at least one optical fiber, and wherein the network router module is in electrical communication with the backplane via at least one electrical conductor.

8. A modular aircraft information system according to claim 1 further comprising an avionics interface module capable of interfacing with at least one avionics device, wherein the network router module is also in electrical communication with the avionics interface module, wherein the network router module is further capable of passing communications between the avionics interface module and at least one COTS device when at least one COTS device is electrically coupled to the backplane, and wherein the network router is further capable of isolating the backplane from the avionics interface module such that the at least one COTS device, when electrically coupled to the backplane, is at least partially isolated from the at least one avionics device interfacing with the avionics interface module.

9. A modular aircraft information system according to claim 8, wherein the avionics interface module is capable of interfacing with at least one avionics device via at least one optical fiber, and wherein the network router module is in electrical communication with the backplane and the avionics interface module via at least one electrical conductor.

10. A method of packaging a modular aircraft information system for communicating information onboard an aircraft, the method comprising:

providing a backplane capable of receiving at least one commercial off-the-shelf (COTS) device capable of operating in an aircraft information system, wherein the backplane is capable of receiving the at least one COTS device such that the COTS is capable of being at least one of electrically coupled and decoupled to the backplane, and wherein the at least one COTS device includes a circuit board for electrically coupling and decoupling the at least one COTS device to the backplane;

providing a network router module capable of interfacing with at least one avionics device; and placing the network router module in electrical communication with the backplane such that the network router module is capable of passing communications between the at least one COTS device and the at least one avionics device when at least one COTS device is electrically coupled to the backplane, wherein placing the network router module in electrical communication further comprises isolating the backplane from the at least one avionics device such that the at least one COTS device, when electrically coupled to the backplane, is at least partially isolated from the at least one avionics device; and securing the backplane and the network router module within an internal cavity defined by a housing, and thereafter closing the internal cavity to thereby at least partially isolate the backplane and the network router module from an external environment.

11. A method according to claim 10 further comprising electrically coupling at least one COTS device to the backplane before closing the internal cavity, wherein the COTS device comprises a server processing element, and wherein securing the backplane and the network router module further comprises securing the at least one COTS device within the internal cavity.

12. A method according to claim 10 further comprising electrically coupling at least one power supply to the backplane and the network router, wherein the power supply is electrically coupled to the backplane and the network router before closing the internal cavity.

13. A method according to claim 12 further comprising electrically coupling at least one COTS device to the backplane before closing the internal cavity, wherein the at least one power supply is electrically coupled to the backplane such that the at least one power supply is capable of providing a predetermined level of power to the at least one COTS device, wherein the at least one power supply further includes at least one backup power module capable of supplying backup power to the at least one COTS device when the power supplied to the COTS device by the power supply drops below the predetermined level, and wherein the at least one power supply is electrically coupled to the backplane so that the at least one backup power module is capable of supplying backup power such that the sum of the backup power and the power supplied by the power supply substantially equals the predetermined level of power.

14. A method according to claim 10 further comprising interfacing the network router module with at least one avionics device via at least one optical fiber, wherein placing a network router module in electrical communication with the backplane comprises placing the network router module in electrical communication with the backplane via at least one electrical conductor.

15. A method according to claim 10 further comprising:
providing an avionics interface module capable of interfacing with at least one avionics device, wherein placing a network router module in electrical communication with the backplane further comprises placing the network router module in electrical communication with the avionics interface module such that the network router module is capable of passing communications between the avionics interface module and at least one COTS device when at least one COTS device is electrically coupled to the backplane, and wherein placing the network router module in electrical communication further comprises isolating the backplane from the avionics interface module such that the at least one COTS device, when electrically coupled to the backplane, is at least partially isolated from the at least one avionics device.

16. A method according to claim 15 further comprising interfacing the avionics interface module with at least one avionics device via at least one optical fiber, wherein placing a network router module in electrical communication with the backplane and the avionics interface module comprises placing the network router module in electrical communication with the backplane and the avionics interface module via at least one electrical conductor.

17. A modular aircraft information system for communicating information onboard an aircraft, the modular aircraft information system comprising:
at least one commercial off-the-shelf (COTS) device capable of operating in an aircraft information system, wherein the at least one COTS device includes a circuit board;
at least one avionics device; and
a network router module in electrical communication with the at least one COTS device and the at least one avionics device, wherein the network router module is capable of passing communications between the at least one COTS device and the at least one avionics device, and wherein the network router is capable of isolating the at least one COTS device from the at least one avionics device.

18. A modular aircraft information system according to claim 17 further comprising a backplane in electrical communication with the network router, wherein the backplane is capable of receiving the COTS device such that the COTS is capable of being at least one of electrically coupled and decoupled to the backplane.

19. A modular aircraft information system according to claim 17 further comprising at least one power supply capable of supplying power to the avionics interface module and the network router, wherein the at least one power supply is electrically coupled to the at least one COTS device such that the at least one power supply is capable of supplying power to the at least one COTS device.

20. A modular aircraft information system according to claim 19, wherein the at least one power supply is capable of providing a predetermined level of power to the at least one COTS device, wherein the at least one power supply further includes at least one backup power module capable of supplying backup power to the at least one COTS device when the power supplied to the COTS device by the power supply drops below the predetermined level, and wherein the at least one backup power module is capable of supplying backup power such that the sum of the backup power and the power supplied by the power supply substantially equals the predetermined level of power.

21. A modular aircraft information system for communicating information onboard an aircraft, the modular aircraft information system comprising:
at least one commercial off-the-shelf (COTS) device capable of operating in an aircraft information system, wherein the at least one COTS device includes a circuit board;
an avionics interface module capable of interfacing with at least one avionics device; and
a network router module in electrical communication with the at least one COTS device and the avionics interface module, wherein the network router module is capable of passing communications between the at least one COTS device and the avionics interface module, and wherein the network router is capable of isolating the at least one COTS device from the avionics interface module such that the at least one COTS device is at least partially isolated from the at least one avionics device.

22. A modular aircraft information system according to claim 21 further comprising a backplane in electrical communication with the network router, wherein the backplane is capable of receiving the COTS device such that the COTS is capable of being at least one of electrically coupled and decoupled to the backplane.

23. A modular aircraft information system according to claim 21 further comprising at least one power supply capable of supplying power to the avionics interface module and the network router, wherein the at least one power supply is electrically coupled to the at least one COTS device such that the at least one power supply is capable of supplying power to the at least one COTS device.

24. A modular aircraft information system according to claim 23, wherein the at least one power supply is capable of providing a predetermined level of power to the at least one COTS device, wherein the at least one power supply further includes at least one backup power module capable of supplying backup power to the at least one COTS device when the power supplied to the COTS device by the power supply drops below the predetermined level, and wherein the at least one backup power module is capable of supplying backup power such that the sum of the backup power and the power supplied by the power supply substantially equals the predetermined level of power.

25. A modular aircraft information system according to claim 21, wherein the avionics interface module is capable of interfacing with at least one avionics device via at least one optical fiber, and wherein the network router module is in electrical communication with the at least one COTS device and the avionics interface module via at least one electrical conductor.

26. A modular aircraft information system according to claim 21, wherein the network router module is capable of interfacing with at least one avionics device, wherein the network router module is capable of interfacing with at least one avionics device via at least one optical fiber, and wherein the network router module is in electrical communication with the at least one COTS device and the avionics interface module via at least one electrical conductor.

27. A modular aircraft information system for communicating information onboard an aircraft, the modular aircraft information system comprising:

a backplane capable of receiving at least one commercial off-the-shelf (COTS) device capable of operating in an aircraft information system, wherein the backplane is capable of receiving the at least one COTS device such that the COTS is capable of being at least one of electrically coupled and decoupled to the backplane, wherein the at least one COTS device includes a circuit board for electrically coupling and decoupling the at least one COTS device to the backplane;

at least one avionics device; and a network router module in electrical communication with the backplane and the at least one avionics device, wherein the network router module is capable of passing communications between the at least one COTS device and the at least one avionics device when at least one COTS device is electrically coupled to the backplane, and wherein the network router is capable of isolating the backplane from the at least one avionics device such that the at least one COTS device, when electrically coupled to the backplane, is at least partially isolated from the at least one avionics device.

28. A modular aircraft information system according to claim 27 further comprising at least one COTS device electrically coupled to the backplane, wherein the COTS device comprises a server processing element.

29. A modular aircraft information system according to claim 27 further comprising at least one power supply capable of supplying power to the network router, wherein the at least one power supply is electrically coupled to the backplane such that the at least one power supply is capable of supplying power to the at least one COTS device when the at least one COTS device is electrically coupled to the backplane.

30. A modular aircraft information system according to claim 29, wherein the at least one power supply is capable of providing a predetermined level of power to the at least one COTS device when the at least one COTS device is electrically coupled to the backplane, wherein the at least one power supply further includes at least one backup power module capable of supplying backup power to the at least one COTS device when the at least one COTS device is coupled to the backplane and the power supplied to the COTS device by the power supply drops below the predetermined level, and wherein the at least one backup power module is capable of supplying backup power such that the sum of the backup power and the power supplied by the power supply substantially equals the predetermined level of power.

* * * * *